March 15, 1949. C. G. GRABERT 2,464,224
TRANSPORT BOX

Filed Dec. 11, 1946 4 Sheets-Sheet 1

Inventor
Carl G. Grabert,
By John B. Brady
Attorney

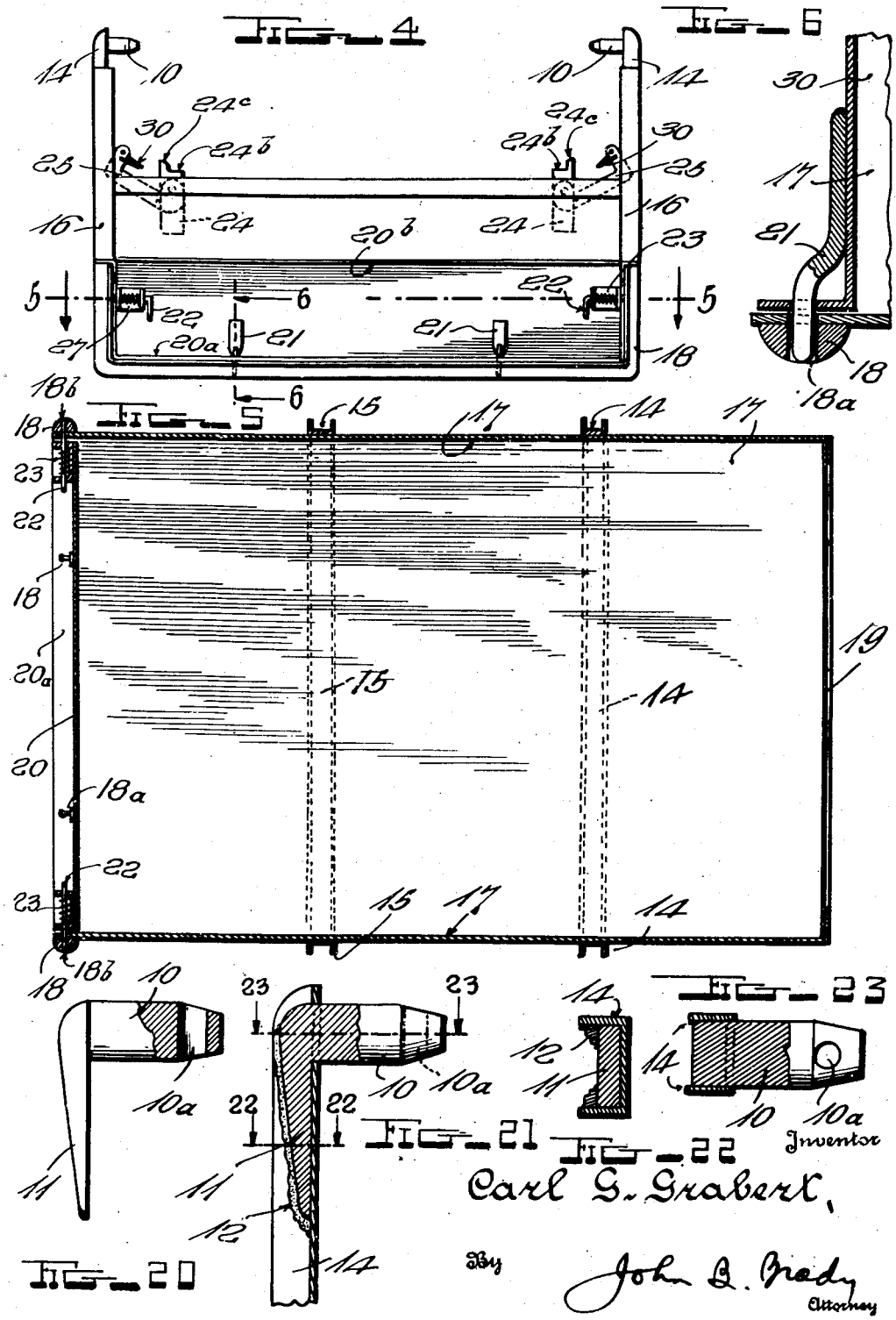

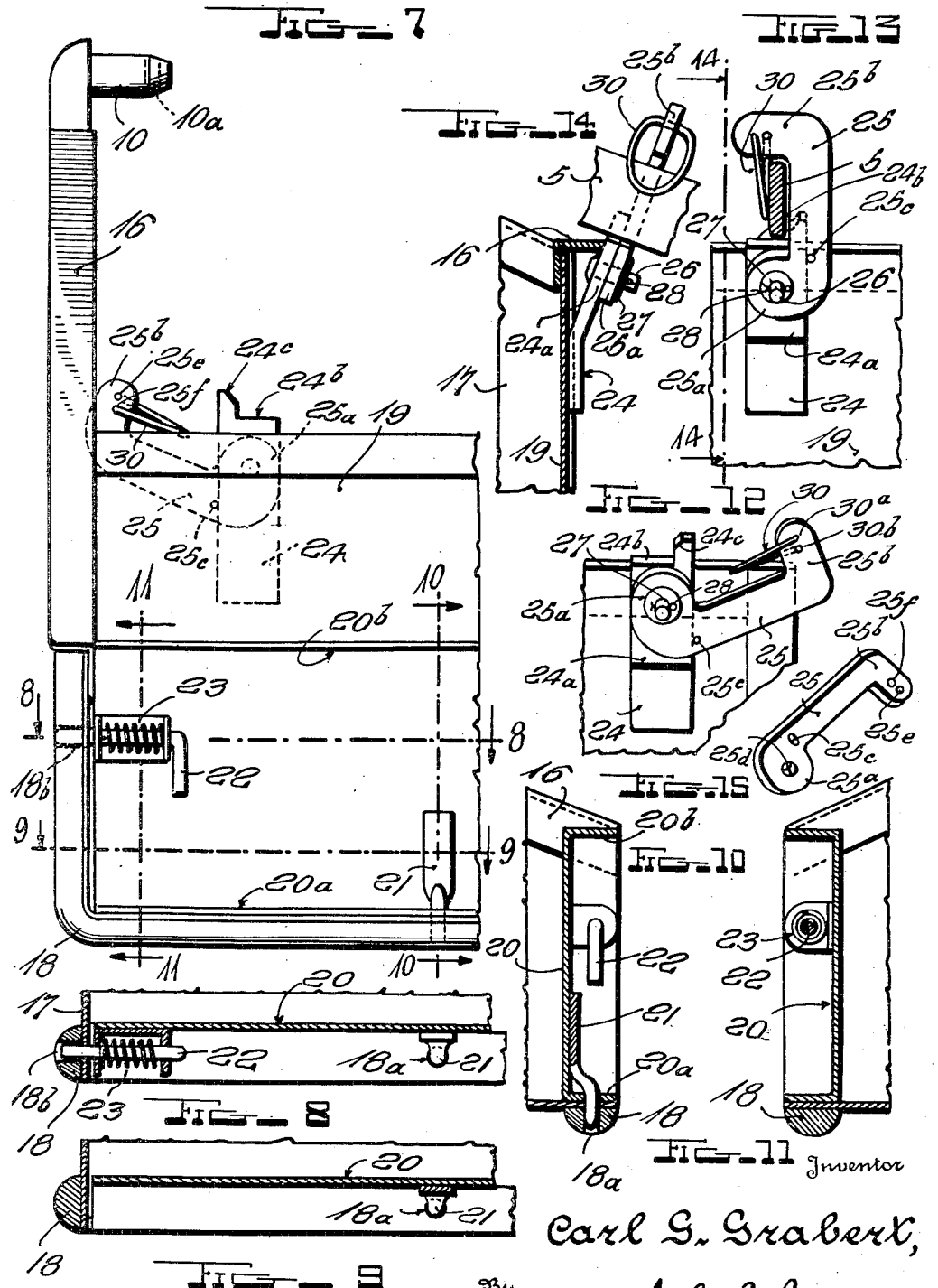

March 15, 1949. C. G. GRABERT 2,464,224
TRANSPORT BOX
Filed Dec. 11, 1946 4 Sheets-Sheet 4
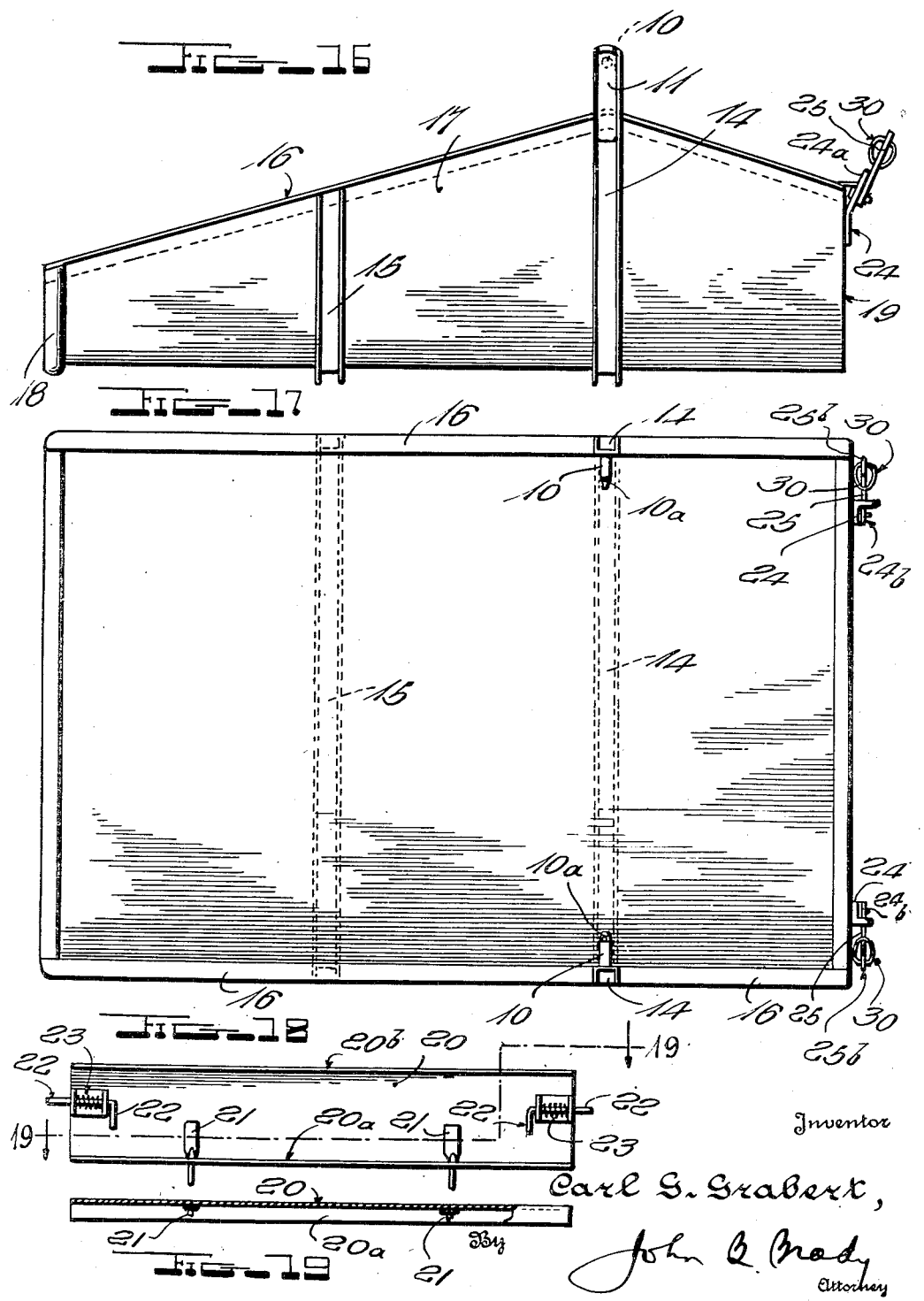

Patented Mar. 15, 1949

2,464,224

UNITED STATES PATENT OFFICE 2,464,224

TRANSPORT BOX

Carl G. Grabert, Newburgh, Ind., assignor to International Steel Company, Evansville, Ind., a corporation of Indiana Application December 11, 1946, Serial No. 715,554

5 Claims. (Cl. 214—130)

My invention relates broadly to attachments for tractors and more particularly to a construction of attachable and detachable transport box for tractors.

One of the objects of my invention is to provide an improved construction of transport box which may be readily attached or detached to a tractor for hauling loads from place to place.

Another object of my invention is to provide a construction of readily portable transport box which is readily attachable to a tractor for hauling and depositing sacked feed, loose corn, stones, materials, tools, dirt, milk cans, barrels, manure and other kinds of loads.

Still another object of my invention is to provide a construction of reinforced transport box which may be readily suspended on the power lift arms of a hydraulic lift mechanism for sufficiently elevating the transport box with respect to a tractor to enable a load carried by the box to be readily transported from place to place.

Another object of my invention is to provide a structure for reinforcing the exposed rear edge of a transport box for insuring adequate structural strength to the box for carrying relatively heavy loads and eliminating sharp edges for preventing plowing and providing a bumper for the box.

Still another object of my invention is to provide a construction of supporting trunnions and detachable securing means for pivotally mounting a transport box with respect to the rear of a tractor.

A further object of my invention is to provide a construction of spring latch means for detachably hooking a transportable transport box in position with respect to the hydraulic lift arms adjacent the rear of a tractor.

Still another object of my invention is to provide an improved construction of detachable end gate for a transport box adapted to be suspended from the hydraulic lift mechanism of a tractor.

Figure 1:
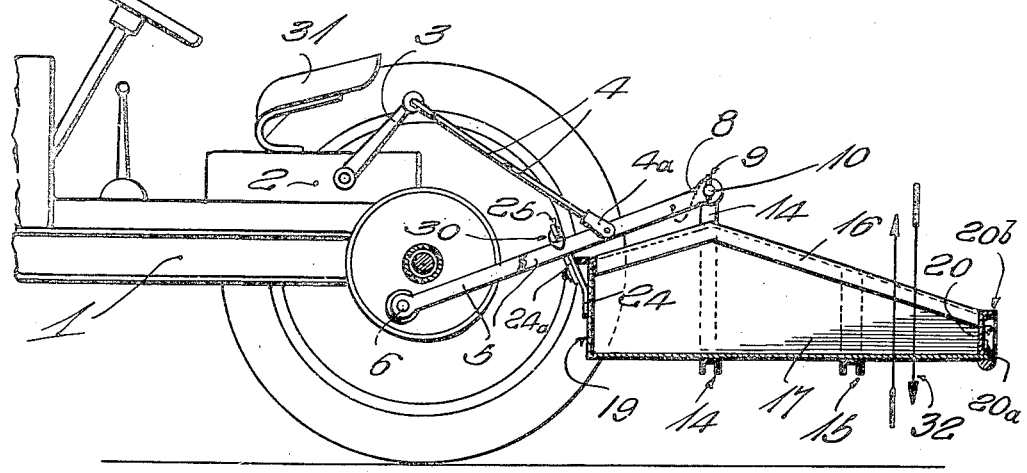
Figure 2:
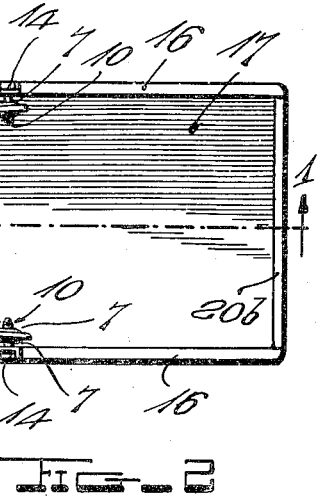
Figure 3:
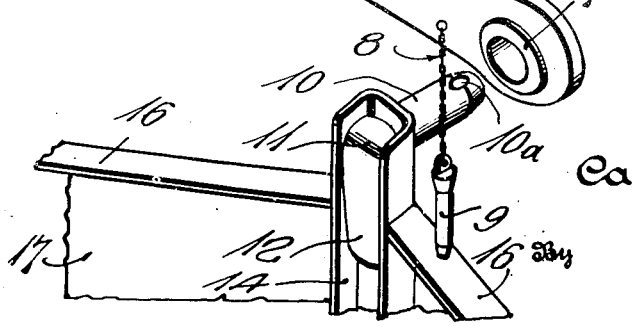

Other and further objects of my invention reside in the improved structural details of the suspension mechanism for a transport box as set forth more fully in the accompanying drawings in which:

Figure 1 is a vertical sectional view taken through a tractor and illustrating the structure of the transport box of my invention and the manner of suspending the transport box adjacent the rear of a tractor, the view being taken substantially on line 1—1 of Fig. 2; Fig. 2 is a plan view of the tractor illustrated in Fig. 1 and showing the transport box of my invention supported by the hydraulic lift mechanism of the tractor; Fig. 3 is a fragmentary perspective view illustrating the manner of pivotally suspending the transport box on trunnions with respect to the hydraulic lift mechanism of the tractor; Fig. 4 is an end view of the transport box of my invention; Fig. 5 is a horizontal sectional view through the transport box taken substantially on line 5—5 of Fig. 4; Fig. 6 is a vertical sectional view through one of the securing means for the end gate of the transport box taken substantially on line 6—6 of Fig. 4; Fig. 7 is a fragmentary end view of a portion of the transport box on a somewhat enlarged scale showing one of the trunnions and one of the bracket members for detachably suspending the transport box from the power lift arm of the hydraulic lift mechanism of the tractor; Fig. 8 is a fragmentary horizontal sectional view taken substantially on line 8—8 of Fig. 7; Fig. 9 is a horizontal sectional view taken substantially on line 9—9 of Fig. 7; Fig. 10 is a vertical sectional view taken substantially on line 10—10 of Fig. 7; Fig. 11 is a vertical sectional view taken substantially on line 11—11 of Fig. 7; Fig. 12 is a detail view of one of the bracket and snap ring members employed for the transport box with respect to the power lift arms of the hydraulic mechanism, the view illustrating the bracket and snap ring moved to a position for detaching the transport box from the power lift arms; Fig. 13 is a detail view showing the suspension bracket and snap ring in position for suspending the transport box from the power lift arms of the hydraulic mechanism of the tractor; Fig. 14 is a fragmentary vertical sectional view taken substantially on line 14—14 of Fig. 13; Fig. 15 is a perspective view of the angularly movable suspension link which forms part of the detachable suspension means for the transport box; Fig. 16 is an enlarged side elevational view of the transport box; Fig. 17 is a top plan view of the transport box; Fig. 18 is an elevational view of the end gate; Fig. 19 is a horizontal sectional view taken through the end gate on substantially line 19—19 of Fig. 18; Fig. 20 is a detail view of one of the trunnion pins employed for pivotally supporting the transport box with respect to the end of the tractor, the pin being partially broken away and illustrated in section; Fig. 21 is a fragmentary vertical sectional view illustrating the manner of securing the trunnion pin with respect to the channel frame of the transport box, a portion of the channel pin being illustrated in side elevation; Fig. 22 is a horizontal sectional view taken substantially on line 22—22 of Fig. 21 and Fig. 23 is a horizontal sectional view taken substantially on line 23—23 of Fig. 21 with a portion of the trunnion pin illustrated in top plan view.

Referring to the drawings in detail reference character 1 represents a tractor including a hydraulic lift mechanism which I have represented associated with the tractor at 2, and arranged to operate the power lift levers 3. The power lift levers 3 operate simultaneously on opposite sides of the hydraulic lift mechanism and are pivotally connected with links 4 which are provided with yoke-shaped connecting means 4a on the ends thereof, which embrace and establish pivotal connection with the power lift arms 5. The power lift arms 5 are pivotally connected adjacent opposite sides of the housing, as represented at 6. Thus, if the hydraulic lift mechanism 2 is operated, the power lift arms 5 may be angularly shifted through various angular positions from a lowermost to a maximum elevated position.

The ends of the power lift arms 5 each carry sleeve bearings 7 and have secured to the arms through a flexible link chain 8, the removable confining pin 9, as shown.

The portable attachable and detachable transport box is shown more clearly in Figs. 4, 5, 16 and 17 and terminates as part of the upper suspension therefor in trunnion pins 10, which are directed outwardly in opposite directions from each other for engagement through the sleeve bearings 7. After engagement of the trunnion pins 10 with sleeve bearing 7 and with the trunnion pins 10 projecting beyond the arms 5 and the sleeve bearings therein, the removable confining pins 9 suspended on chains 8 are passed through the diametrically extending apertures 10a in pins 10 for securing the trunnion pins 10 in angularly removable engagement with sleeve bearings 7. The trunnion pins 10 are provided with a head extending at right angles thereto, as represented at 11, and shaped to conform with the inner contour of the channel-shaped frame member 14 of the transport box. The projecting end 11 of each trunnion pin 10 is welded inside the channel-shaped frame 14 adjacent each end thereof with the trunnion directed inwardly toward each other in engagement with the sleeve bearings 7 in each of the power lift arms 5.

The transport box includes, in addition to the channel-shaped frame 14, a spaced channel-shaped frame 15 extending parallel thereto. The channel-shaped frames 14 and 15 terminate in and are welded to the metallic angle frame 16, forming a cradle for supporting the sheet metal material 17, forming the transport box.

The transport box 17 reinforced by channel-shaped members 14 and 15 and the edge frame 16 is provided with an end bumper constituted by a half round reinforcing strip 18, which extends around the bottom and sides of the extreme end of the transport box. The half round reinforcing strip is provided with spaced apertures 18a in the bottom of the strip and oppositely aligned apertures 18b in the sides of the strip. These apertures accommodate engaging means carried by the end gate of the transport box.

The end gate 20 is wholly removable from the end of the transport box and is provided with a pair of reinforcing substantially parallel extending edges 20a and 20b for increasing the rigidity of the end gate. A pair of spaced lugs are secured to the end gate 20, as shown at 21, and extend through the reinforcing edge 20a in positions aligned with the apertures 18a in the bottom of the transport box and in the half round reinforcing strip 18. The ends of lugs 21, when engaged in apertures 18a, serve to steady and confine end gate 20 with respect to the end of the transport box. In addition to the lugs 21 extending through the lower edge of the end gate, I provide a pair of spring actuated substantially horizontally disposed latches 22 at opposite ends of the end gate 20, each of the latches being spring operated by coil springs 23 for urging the latches 22 into engagement with the apertures 18b in the upwardly extending side portions of the half round reinforcing strip 18. The latches 22 are suitably bent to form engaging handles to permit the latches to be quickly withdrawn against the action of coil springs 23 to allow the end gate to be readily moved into engagement with the end of the transport box.

The opposite end wall of the transport box is formed by wall member 19, which may be integrally connected with the bottom 17 of the transport box and welded to the top angle iron frame 16. The wall 19 of the transport box serves as a support for bracket members 24. The bracket members 24 are each angularly inclined away from the transport box and toward the driver's position on the tractor 1. Each bracket 24 has an angularly inclined portion 24a which projects beyond the peripheral angle iron frame 16 and serves as a pivotal support for the hook-shaped links 25. The hook-shaped links are shown more clearly in Figs. 12–15 as including an elongated link having a side projection 25a and 25b at each end thereof and having a stop pin 25c disposed adjacent the end 25a thereof. The end 25a is apertured at 25d through which pin 26 carried by the angularly inclined portion 24a of bracket 24 is arranged to extend. The pin 26 serves as a journal around which link 25 is adapted to be angularly shifted. The link 25 is retained in angularly adjustable position on pin 26 by means of washer member 27 and confining cotter pin 28 and is adapted to be angularly shifted from the position illustrated in Fig. 12 in which stop pin 25c abuts against the edge of the inclined portion 24a of bracket 24, which is the disengaged position of the hook-shaped link to the position illustrated in Fig. 13, which is the engaged position of the hook-shaped link wherein stop pin 25c abuts against the edge of the inclined portion 24a of bracket 24 more closely adjacent the extremity thereof. The inclined portion 24a of the bracket 24 is provided with an anvil face 24b and an upstanding projecting portion 24c at the extremity thereof. The two brackets 24 are so mounted with respect to the wall 19 that the upstanding projecting portions 24c are adjacent the outer walls of the transport box and serve as abutment and confining means for the sides of the power lift arms 5. The hook-shaped link members 25 each carry snap rings 30 on the lug portions 25b thereof. The snap rings 30 are each formed from resilient wire forming a loop having the ends thereof displaced from each other. The resilient wire loop 30 has one end 30a extending into aperture 25e in lug 25b of the hook-shaped link 25, while the other end 30b thereof projects into the spaced aperture 25f in the lug 25b. Thus the loop 30 by virtue of its resilient characteristics is maintained in a condition of continuous tension which normally tends to maintain the hook-shaped link 25 into engagement with the power lift arm 5, as represented in Figs. 13 and 14. In this position the transport box is maintained in suspension on the hydraulic lift arms 5. If, however, the operator of the tractor desires to disengage the transport box the operator may conveniently lean backwardly from the driver's position in the seat 31 and grasp resilient loop 30 and draw this forward sufficiently to allow hook-shaped link 25 to drop out of engagement with the power lift arm 5, as illustrated in Figs. 4, 7 and 12. The same process may be repeated for the opposite spring loop 30, thereby readily disengaging the snap rings from engagement with the power lift arms 5. The operator may then operate the hydraulic mechanism to lower the transport box from the suspending trunnions 10 in the direction illustrated by arrow 32 in Fig. 1. When the transport box reaches the ground the operator may readily withdraw confining pins 9 and angularly shift power lift arms 5 sufficiently to disengage sleeve bearing 7 from trunnion pins 10, thereby freeing the transport box from the tractor. The tractor may then pick up a loaded transport box by a reverse process in which the operator from the driver's seat may readily move the power lift arms 5 to a position in which sleeve bearings 7 engage trunnion pins 10, after which confining pins 9 are slipped in position. The hook-shaped links 25 may then be individually moved from the positions illustrated in Figs. 4, 7 and 12 to the positions illustrated in Figs. 13 and 14 with snap rings 30 raised sufficiently to allow the hook-shaped rings to be engaged over the power lift arms 5. The loop 30 may then be released, whereupon the torsion therein causes the loops to spring into a position engaging the sides of the power lift arms 5, whereupon the power arms are confined against the anvil faces 24b and upwardly extending projecting portions 24c of bracket members 24 so that the transport box may be readily raised under control of the hydraulic mechanism for transporting the load.

I have found the transport box of my invention very practical for manufacture and production at relatively low cost on a mass production basis. The transport box has proven highly successful in the transportation of loads of various descriptions. The transport box serves a very useful purpose in the hauling and depositing of sacked feed from barn to hen house, loose corn from crib to pig pen, stones from field to fence line or wherever desired, materials and tools for fence building or repairs, dirt from an excavation or for a fill, milk cans from the dairy to the pick-up station, manure from barn to manure pile and many other general and specific uses. The overall measurements of the transport box are 47" long, 30⅝" wide, front depth 10¾", center depth, 17⅜" and back depth 6", with a capacity of 10⅛ cubic feet. The transport box attached to a standard tractor readily and efficiently carries a load of 750 to 800 pounds.

While I have described my invention in one of its preferred embodiments I desire that it be understood that modifications may be made and that no limitations upon my invention are intended other than may be imposed by the scope of the appended claims.

What I claim as new and desire to secure by Letters Patent of the United States, is as follows:

1. An attachable and removable transport box comprising in combination with a pair of spaced lifting arms a hopper having front rear and side walls formed to enter the space between said arms, side wall extensions on said transport box, pintles extending inwardly from said side wall extensions, latch members secured to the front wall of said hopper and diverging at an acute angle away from the front wall of said hopper, said pintles and latch members each detachably engaging said lifting arms, pin means suspended from said arms and detachably engageable in said pintles when said pintles are engaged in said arms, and spring means associated with said latch members for confining said latch members in detachable engagement with said lifting arms.

2. An attachable and removable transport box comprising in combination with a pair of spaced lifting arms a hopper having front rear and side walls formed to enter the space between said arms, side wall extensions on said transport box, pintles extending inwardly from said side wall extensions, latch members secured to the front wall of said hopper and diverging at an acute angle away from the front wall of said hopper, said pintles and latch members each detachably engaging said lifting arms, said latch members each including an anvil portion and an angularly movable portion, said angularly movable portion being yoke-shaped and pivoted at one end on said anvil portion and carrying a spring member at the other end, said spring members operating to confine said angularly movable portion over said lifting arms when said pintles are engaged with said lifting arms.

3. An attachable and removable transport box comprising in combination with a pair of spaced lifting arms a hopper having front rear and side walls formed to enter the space between said arms, side wall extensions on said transport box, pintles extending inwardly from said side wall extensions, latch members secured to the front wall of said hopper and diverging at an acute angle away from the front wall of said hopper, said pintles and latch members each detachably engaging said lifting arms, said latch members each including anvil portions having symmetrically arranged remotely disposed upwardly extending abutments operative to engage the opposite remote surfaces of said lifting arms, pivotally mounted portions carried by said anvil portions and swingable toward each other for engaging said lifting arms, and spring means carried by each of said pivotally mounted portions for confining said anvil portions with respect to said lifting arms while said pintles are engaged in said lifting arms.

4. An attachable and removable transport box for tractors comprising a hopper having a supporting frame, a metallic plate carried by said frame and forming the confining walls and bottom of said hopper and a reinforcing strip carried by the trailing end of said hopper external to said metallic plate, said strip being substantially semi-cylindrical in cross section and forming a buffer for the trailing edge of said hopper, and a reinforcement for the bottom and opposite side walls thereof, an end plate for said hopper, pin members carried by said end plate and entering socket openings in the bottom of the metallic plate forming said hopper and extending into said reinforcing strip, and spring actuated retractible symmetrically disposed latches carried by said end plate and operative to enter sockets through the metallic plate constituting the opposite side walls of said hopper and through opposite aligned openings in said reinforcing strip.

5. An attachable and removable transport box for tractors comprising a hopper for attachment and detachment with respect to elevating arms carried by a tractor, said hopper including a frame having pintle members and angularly movable latch members thereon engageable with and disengageable from the elevating arms, said latch members each including a spring loop device resiliently displaceable from a disengaged position to a position engaging said elevating arms.

CARL G. GRABERT.

REFERENCES CITED

The following references are of record in the file of this patent:

UNITED STATES PATENTS

| Number | Name | Date |
|---|---|---|
| Re. 22,912 | Gaertner | Sept. 9, 1947 |
| 892,163 | Kidd | June 30, 1908 |
| 902,423 | Lockwood | Oct. 27, 1908 |
| 1,547,592 | Larner | July 28, 1925 |
| 1,555,227 | Moses | Sept. 29, 1925 |
| 2,168,495 | Rasmussen | Aug. 8, 1939 |
| 2,225,076 | Mosher | Dec. 17, 1940 |
| 2,290,738 | Chadwick, Jr. | July 21, 1942 |
| 2,397,046 | Richey | Mar. 19, 1946 |
| 2,424,429 | Bamberg | July 22, 1947 |